United States Patent [19]

Irving

[11] 3,937,337
[45] Feb. 10, 1976

[54] VEHICLE MOUNTED LOADER AND UNLOADER

[76] Inventor: Joseph F. Irving, Rte. 2, Continental, Ohio 45831

[22] Filed: May 14, 1974

[21] Appl. No.: 469,797

[52] U.S. Cl.................................. 214/80; 212/145
[51] Int. Cl.² ........................................... B60P 1/48
[58] Field of Search ......... 212/145; 214/77 R, 77 P, 214/78, 80, 140, 146.5

[56] References Cited
UNITED STATES PATENTS

| 2,665,815 | 1/1954 | Blight | 214/77 R |
| 2,935,214 | 5/1960 | Fly | 214/77 R |
| 3,603,464 | 9/1971 | Teodorescu | 214/77 R |
| 3,721,355 | 3/1973 | Irving | 214/77 R |

*Primary Examiner*—Robert J. Spar
*Assistant Examiner*—Lawrence J. Oresky
*Attorney, Agent, or Firm*—David H. Wilson

[57] ABSTRACT

A vehicle mounted mechanism for manipulating long load units such as pipe lengths which extend over a substantial portion of the load carrying length of the vehicle. The mechanism is stored within the width limit of the vehicle beneath its bed for over the road travel. It includes articulated linkages, and operating means attached to the side of the vehicle bed operable between the ground and an elevation substantially above the bed and over a substantial range transverse of the bed. An inner and outer boom support a load engaging assembly such as a cradle. The unit can be moved along the length of the vehicle bed while carrying a load and can operate adjacent wheels and other elements beneath the bed within the vehicle width limits. A power unit can be integrated with the loader and arranged for movement between a stored position and a position free of the region beneath the vehicle bed.

28 Claims, 14 Drawing Figures

VEHICLE MOUNTED LOADER AND UNLOADER

BACKGROUND OF THE INVENTION

U.S. Pat. No. 3,721,355 of Mar. 20, 1973 for "Vehicle Mounted Loader and Unloader" by Joseph F. Irving discloses a mechanism of the type of this invention wherein a base structure is mounted on the side of a vehicle bed so that it can be moved along the length of the bed to align it with loads to be transferred between the bed and an area beside the vehicle. An inner boom is shown mounted on the base for pivotal motion around a coupling having an axis parallel to the vehicle side. This coupling is mounted within the width limit of the vehicle and therefore imposes restrictions on the arc of motion of the inner boom in the region above the level of the vehicle bed thereby limiting the range of motion of the load transfer mechanism supported on an outer boom pivotally coupled to the inner boom.

It has been found that the load transfer mechanism of U.S. Pat. No. 3,721,355 is often positioned along the vehicle side in a less than optimum position for picking up or depositing the load as where the vehicle is not positioned with its desired load carrying area in precise transverse alignment with the area adjacent the vehicle in which the load is to be picked up or deposited. Both the transverse range and longitudinal range of load manipulation have been limited such that even a skilled vehicle driven and unloader operator have been required to make extra adjustments of the vehicle and unloader in order to complete a load transfer.

The mechanism of U.S. Pat. No. 3,721,355 is ordinarily installed on a completed truck. Installation has involved substantial time and effort where the load transfer unit is installed separately from the power unit supplying the power to operate the load transfer unit. Where a unitary assembly of a load transfer mechanism and a power unit was provided to enable installation of a single unit and to avoid the need for installing connections between the units, the fixed mounting of the power unit limited the range of motion of the assembly along the side of the vehicle. The power unit mounted within the vehicle width limits could not clear the vehicle wheels or any other elements depending from the bed along its margin.

In accordance with the above an object of the present invention is to improve a vehicle mounted loader and unloader.

Another object is to increase to versatility of a vehicle mounted loader and unloader by increasing the load capacity of the mechanism and increasing its range of motion.

A further object is to enable a vehicle mounted loader and unloader adapted for motion along the side of the vehicle to be moved along the side while under load.

A fourth object is to drive a vehicle mounted loader and unloader along the side of the vehicle and to drive the extension and retraction of the load manipulating means transverse of the vehicle even when carrying a load.

A fifth object is to stabilize a vehicle mounted loader and unloader assembly against unbalanced loading over the entire range of travel of the assembly along the side of a vehicle.

SUMMARY OF THE INVENTION

The present invention relates to load manipulating devices and more particularly to such devices for mounting on and traveling with vehicles having load carrying beds accessible to the load manipulating devices.

The above objects are realized by an assembly comprising a base structure for mounting on the side and under frame of a vehicle bed and for supporting linkages including a sub-base which can be extended from and retracted into the width limit of the vehicle. A latch for the sub-base is arranged to fix its position when the assembly is retracted beneath the vehicle bed for travel and to fix its position in an extended poistion beyond the vehicle bed for load manipulation. Advantageously, the base and sub-base structure with the latch engaged between them for load manipulation, is arranged for movement along the side of the vehicle and is dimensioned so that the structure clears the vehicle wheels when positioned in transverse alignment with the wheels.

Movement of the base, sub-base and latch as a carriage is provided by longitudinal rails secured to the vehicle, as to the lower portion of the side rails of a flat bed semi-trailer, and to the main frame of the vehicle. Typically, rollers are mounted on the base and engage an upper surface of an inner rail, welded to the side of the main frame, and a set of rollers engage the inner side and the outwardly extending upper surface portion of the outer rail. Rollers can also be arranged to engage downward facing rail faces to accommodate moments of force on the base structure under certain load manipulation conditions.

A drive for the base structure enables the load manipulating device to be moved along the side of the vehicle while carrying a load. A rotating drive to a sprocket mounted on the base structure provides this driving force, in the illustrated embodiment. A roller chain is maintained parallel to the support rails and carried through a bight as by passing over base mounted idler sprockets on either side of the drive sprocket. Thus the bight passes over a substantial portion of the drive sprocket and is effectively moved along the chain as the drive sprocket is rotated to drive the base.

The load manipulating mechanism is mounted on the base structure as a combination of a load engaging element, such as a cradle movable mounted on articulated booms which can be positioned over a broad range in both the vertical and horizontal directions. The boom system includes an inner boom pivotally coupled to the sub-base at a first end and pivotally coupled to an outer boom at a second end. Boom motion is in planes normal to the vehicle side. Extension of the lateral range of motion is afforded in part by the inner boom pivotal motion about its sub-base pivot, particularly in a motion beyond the vertical above the sub-base, by virtue of a reciprocating drive element which is pivotally coupled to the sub-base below and outboard of the inner boom pivot and engages a pivot on the inner boom offset from its longitudinal axis between the sub-base pivot and the outer boom pivot. The extendable sub-base enables the mounting pivot for the inner boom to be extended beyond the vehicle side rail thereby enabling that boom to be carried upward through an arc to or beyond the vertical.

The outer boom accommodates a wide range of motion under load conditions by virtue of a low friction mount of a telescoping extension section which is provided with a reciprocating drive. Opposed rollers on a guide section of the outer boom engage a tube fitting into the guide section. The pivotal connection to the inner boom and the drive of pivotal motion for the outer boom are connected to the guide section. Load engaging means are provided on the telescoping extension section together with the manipulating and drive mechanisms for that means.

A wide range of rotation of the load engaging means, the pipe cradle, is afforded by mounting the cradle on a turning tube having a lobe or offset to which a drive link is pivotally coupled. The extension section of the outer boom has a sub-frame which mounts a reciprocating drive for cradle rotation. A turning arms is engaged by the reciprocating drive at a pivot connection spaced from a pivot rod mounting the turning arm on the sub-frame. A drive pivot on the turning arm offsets the drive effort of the reciprocating drive and applies it to the link coupled to the lobe on the cradle turning tube to provide an arc of driven motion in excess of that available with a direct coupling of the drive to the lobe. The turning arm is driven at the apex of a leg to the pivot rod and a leg to the drive link subtending an obtuse angle toward the cradle turning tube to enhance this range of motion. A further enhancement of the motion range is achieved by forming the drive link in an arc convex to the turning tube to offer clearance of the turning tube over a greater range.

The range of extension and load capacity of the loader and unloader can approach the capacity of the vehicle suspension system on which it is mounted. In order to relieve such near capacity forces, the mechanism is provided with a ground engageable foot which can be folded between the stored and load transfer positions. A leg carrying the foot is slidably mounted in a guide on the sub-base so that it can be adjusted to the proper extension when the sub-base is in its load transfer position and can be retracted for folding the mechanism in its storage position.

In order to minimize installation time and the lengths of runs of drive conduit, high pressure hydraulic hose in the example, a power unit is mounted on the base of the load transfer mechanism. A housing for an internal combustion engine, pump, fluid reservoir, battery and control mechanism is suspended on a pair of arms pivoted to swing in like arcs in a plane generally paralleling the vehicle bed. The location of these arms is sufficiently close to the underside of the bed to clear the vehicle wheels when the mechanism is positioned in alignment with the wheels. This enables the power unit to be swung from a region beneath the vehicle bed and within its width limits for over the road travel to a position clear of the wheels and outboard of the width limits.

Thus, the loader and unloader provides a readily controlled, powered mechanism for positive manipulation of long bulky articles between a truck bed and an off-load site. The mechanism can be collapsed and retracted into a compact structure with the width limits of the vehicle when the vehicle is in transit. Control of hydraulically powered drive means for the several parts is conveniently accomplished, as by a truck driver from a position remote from the load, using a control box having electrical switches coupled by cable to solenoid operated valves. The valves in turn, control the flow of hydraulic fluid to the several drive mechanisms.

DESCRIPTION OF THE PREFERRED EMBODIMENT

Figure 1:
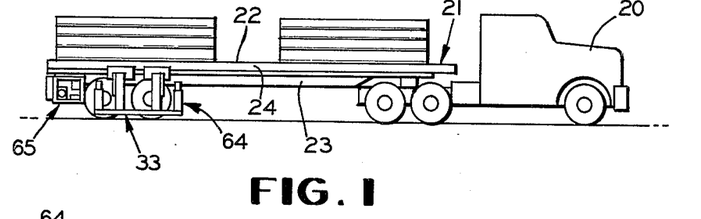
FIG. 1 is a schematic elevational view of the apparatus in accordance with this invention mounted on a semi-trailer and positioned to transfer an object between a load area adjacent the trailer bed and the load support element.
Figure 2:
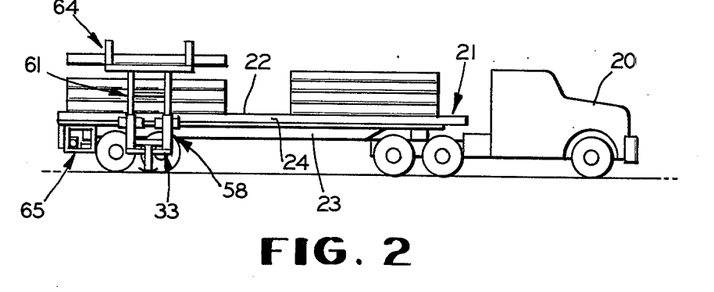
FIG. 2 is a view similar to FIG. 1 illustrating the apparatus in a position to transfer an object between the trailer bed and the load support element.
Figure 3:
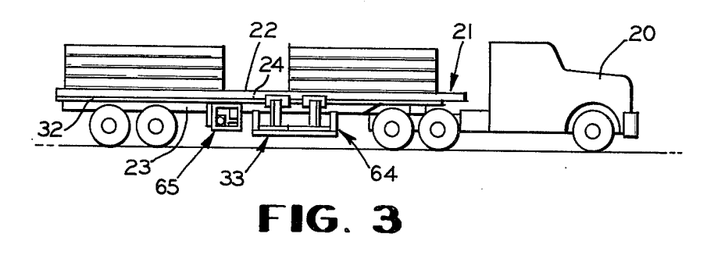
FIG. 3 is a view similar to FIG. 1 illustrating the apparatus in a stored position for transit.

FIGS. 1 through 3 illustrate a tractor 20 and semi-trailer 21 having a flat bed 22 supported by a frame 23. The bed 22 has side rails 24 attached to the main frame member 25 by cross members 27. Conventionally the side rails 24 have stake pockets 28 within a rub rail 29 defining the width limit of the vehicle.

Guiding rails 31 and 32 as shown in FIGS. 4 through 7 are applied respectively to the conventional main frame member 25 and side rail 24 for support of a load manipulating device or a loader and unloader 33. Rail 32 is positioned on the bed side rail 24 with an upper load bearing face 34 a lower face 35 and an inner face 36 each of which is engageable by rollers of the base 37 of device 33 as will be explained. Rail 31 has an upper load bearing face 38 engagable by rollers 39 of base 37. Where rail 31 is a channel having its web secured against main frame member 25, the upper flange of the channel has an inner face 41 providing a lower face for engagement by rollers 39 under certain conditions of loading.

Base 37 comprises a carriage including outer channel form members 42 on which shafts 43 and 44 for rollers 45 and 46 are secured as by threaded connections in suitably tapped apertures. Lock nuts 47 and 48 secure the shafts when in position to properly locate rollers 45 and 46. Extending inward from members 42 are cross braces 49 which are secured to member 42 and back plate 50 as by welding to form a carriage sub-frame 51. Two such carriage sub-frames 51 are longitudinally spaced along the side by back plate 50 and coupling plate 52 having its major plane parallel to those of back plate 50 and members 42 of each sub-frame. Rollers 39 are secured to back plates 50 by threaded connection of shafts 53. Thus two coupled sub-frame assemblies 51 form a carriage base 37 which is roller supported on the upper faces 34 and 38 of rails 32 and 31 and thus by the vehicle from one of its main frame members 25 and a side rail 24.

A plate 54 spans the upper portion of each cross brace 49 pair of each sub-frame 51 and provides a mounting for generally vertical shafts 55 on which rollers 56 are rotatably journaled. Rollers 56 are located to bear upon the inner face 36 of rail 32 to retain the base or carriage 37 on its rail supports 31 and 32.

The major elements supported from carriage or base 37 are sub-bases 57, from which depend inner booms 58 pivotally coupled at 60 to outer booms 61 which carry journals 62 for the turning tube 63 of load engaging cradle 64. A power unit 65 is mounted adjacent the left-hand sub-frame 51 as viewed in FIG. 4. The carriage or base can be mounted on either side of the vehicle 21.

Sub-bases 57 are made up of paired plates 66 and 67 pivoted to respective sub-frames 51 at 68 by a pivot rod secured to cross braces 49. Outer plate 66 and inner plate 67 are each of "L" shape and have a short leg 69 and 71 respectively which extends from the pivot 68. The apices of the legs of plates 66 and 67 extend downward from their support pivot 68 so that upon counterclockwise rotation through about 90° of sub-base 57 as viewed on FIGS. 5 and 6 the longer legs 73 and 74 of the "L"s are positioned vertically and the apices are outboard of the width limit of vehicle. Inner boom 58 is pivoted to the sub-frame 57 at 59 near the apices of the sub-frame legs so that the rotation of those legs around pivot 68 extends pivot 59 and the inner end of the inner boom 58 beyond the width limit of the vehicle. This affords a large arc of motion for inner boom 58 free of the rub rail 29.

A reciprocating drive 76 for inner boom 58 in the form of a cylinder 77 and piston rod 78 is coupled at the cylinder back end to sub-base 57 by pivot 79 and to the inner boom through rod 78 at pivot 81. Pivot 79 is positioned outboard of the inner boom pivot 59 while pivot 81 is offset on lobe 82 of inner boom side plates 83 and 84 further enlarging the arc of motion through which the boom can be carried.

Outer booms 61 are pivotally coupled to the outer ends of inner booms 58 at pivots 60 on offset lobes 86. Each outer boom has a guide section 87 and an extension section 88 having telescoping tubes 89 of generally rectangular form. Tubes 89 are of a length to pass through the guide sections 87 to a back end 90. The offset lobes 86 position the pivots 60 to clear tubes 89. Guide sections 87 are coupled to reciprocating drives 91 at the front end of that drives, piston rods 92, by means of pivotal couplings 93. The back ends of drives 91, hydraulic cylinders 94, are coupled to lobes 95 at pivots 96 on inner booms 58 which are so located on the booms as to be above the vehicle bed 22 when the inner booms are raised. This permits the drives 91 and their outer booms 61 to extend across the bed 22 thereby enhancing the range of positions of cradle 64. The pivotal couplings 93 are also secured to lobes 97 on outer boom guide sections 87 to provide clearance for telescoping tubes 89.

It is desirable that the outer boom extensions 88 be adapted for reciprocation in the guide sections 87 even under load. In order to facilitate such reciprocation, anti friction means such as front and back roller pairs 98 and 99 are positioned to engage the top and bottom faces of each tube 89 and reciprocating drive means 101 such as cylinders 102 and piston rods 103 (shown in FIGS. 5 and 6 and shown extended in FIG. 7) are mounted on the outer boom. Cylinders 102 are coupled by pivots 104 to brackets 105 extending from guide sections 87 and piston rods 103 are coupled by pivots 106 to journals 62 on the outer ends of extension sections 88.

Figure 7:
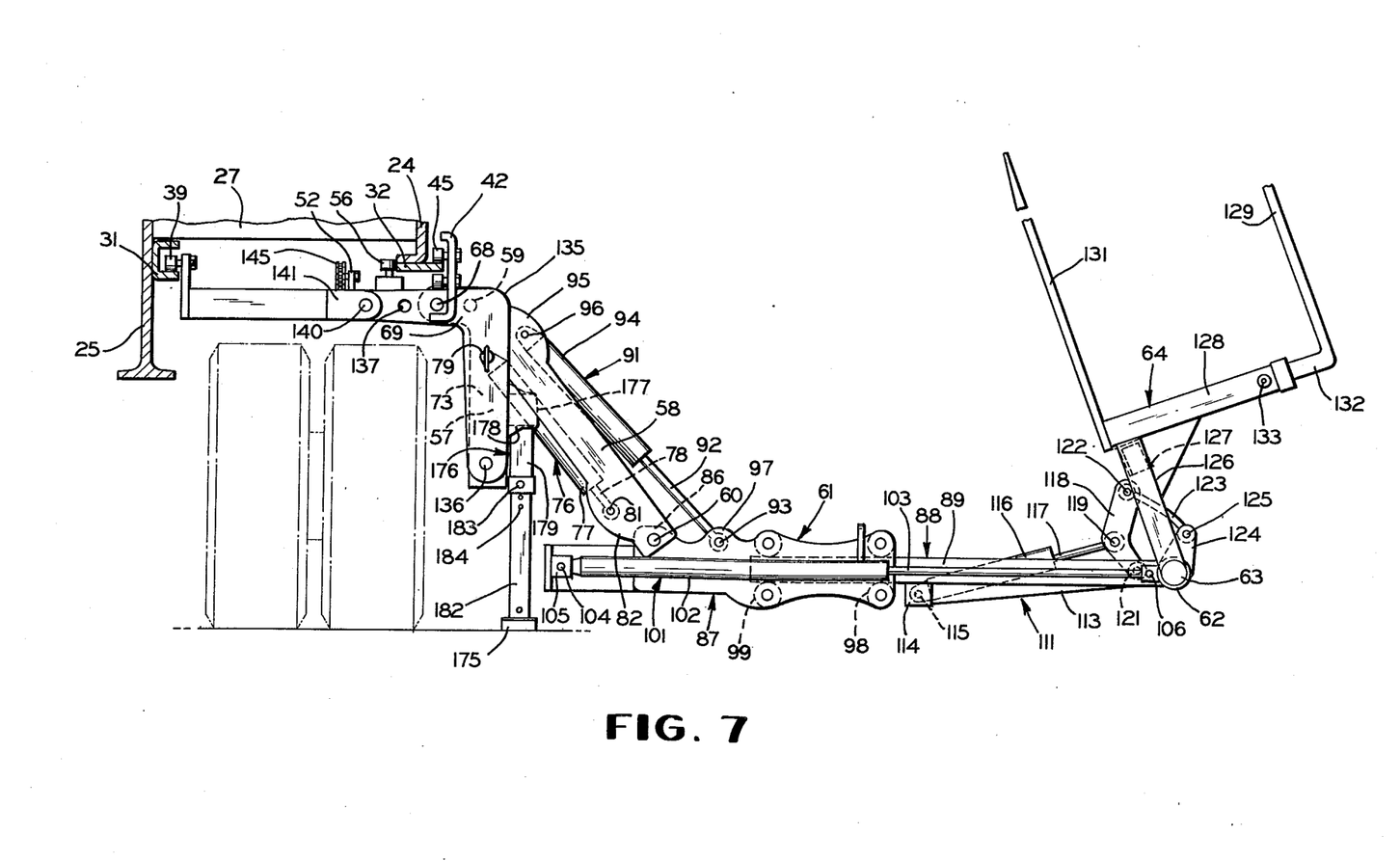
FIG. 7 is an end view taken at line 5—5 of FIG. 4 with the apparatus extended and the load supporting means rotated out of the stored position.
Figure 13:
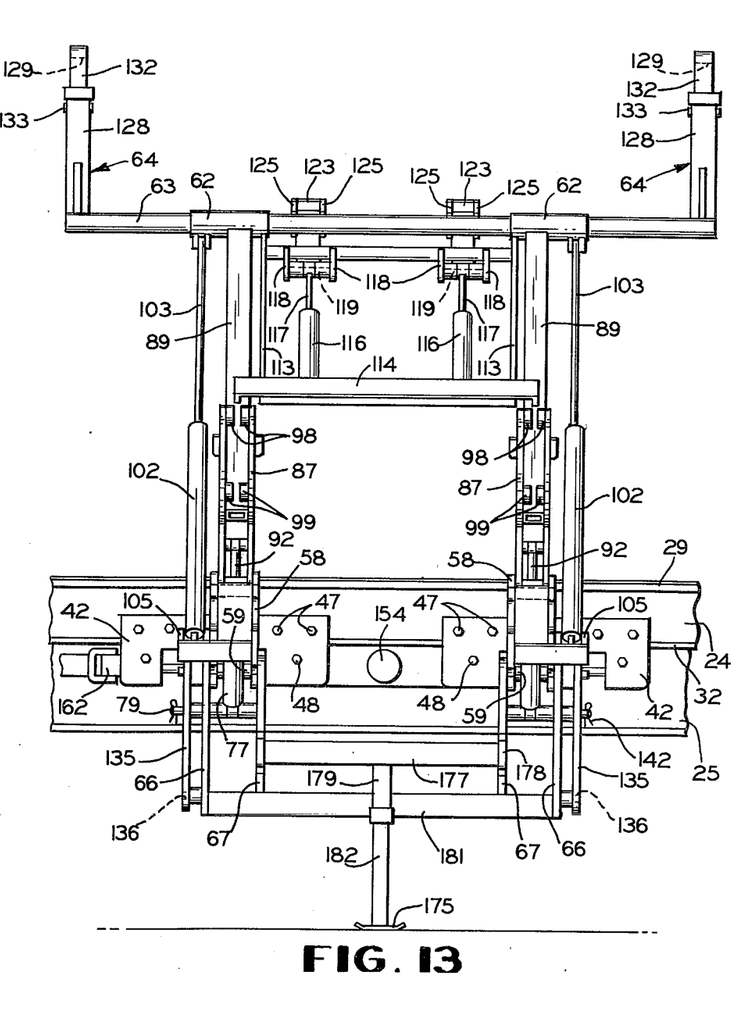
FIG. 13 is a side view of the mechanism as illustrated in FIG. 12.

A frame 111 is supported on the outer ends of the extension sections 88 of the two articulated boom linkages to support turning mechanism 112 for the load engaging cradle 64. As best seen in FIGS. 7 and 13, the frame is secured to journal tubes 107 by side bars 113 extending to a cross bracket 114 providing mountings for pivotal connections 115 to the back ends of turning cylinders 116. Piston rods 117 from cylinders 116 engage dog leg turning links 118 at their apices by pivots 119. Turning links 118 are provided on a turning rod 121 extending between side bars 111. The distal end of links 118 have pivotal connections 122 to drive links 123 which pivotally engage turning cranks 124 secured on the turning tube 63 of the cradle 64 at 125. The dog leg form of link 118 provides extra driving motion to cradle 124 since it permits additional arcuate motion over that provided by a straight link before intersecting the turning tube 63. In addition drive link 123 is curved in its plane of motion to present a concave form toward turning tube 63 and provide additional clearance. This drive affords about 270° of driving motion without passing through an over center position of the pivots.

Cradle 64 is made up of turning tube 63 journaled at 62 on the ends of the outer boom extension sections 88 for rotation by drive 112 described above. It includes arms 126 longitudinally spaced along tube 63 and secured thereto as by welding. A transverse channel 127 joins the arms in a region spaced from the tube 63. Guide tube 128 is secured to arms 126 to receive an "L" shaped tine 129 in the general plane of each arm and each arranged to cooperate with a generally parallel tine 131 secured to tube 128 and parallel to the longitudinal axis of arms 126. Tine 129 has a base tube 132 fitting within tube 128 and having a series of apertures along its length registering with aperture 133 in tube 128 so that a locking pin (not shown) can be inserted to lock the position of tine 129 and its spacing from tine 131 as desired for the load to be manipulated.

Figure 5:
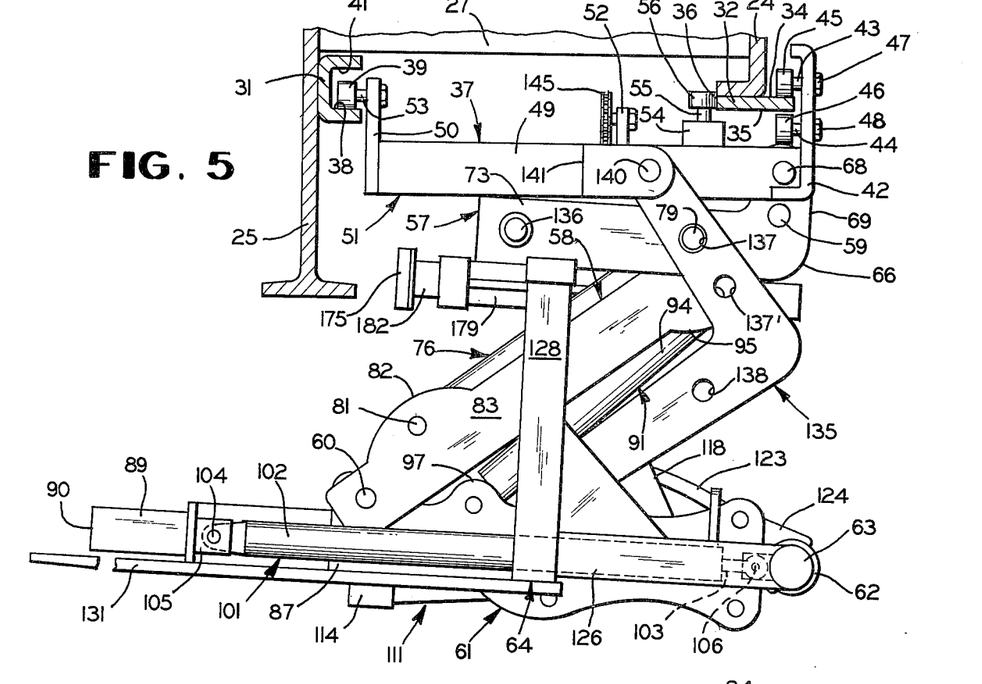
FIG. 5 is an enlarged end elevational view of the apparatus of FIG. 4 taken along the line 5—5 thereof with portions of the vehicle bed, and guide rails sectioned and the power unit and its supports eliminated to reveal greater detail.
Figure 6:
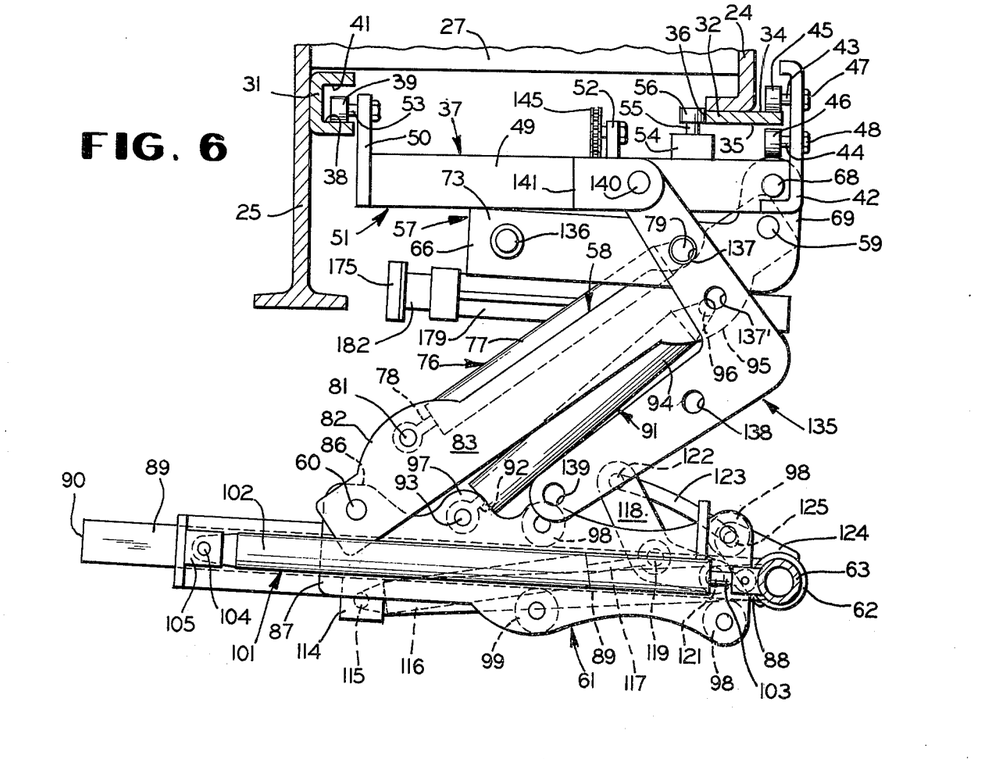
FIG. 6 is an end view similar to FIG. 5 taken along line 6—6 of FIG. 4 with the load supporting cradle eliminated and certain elements shown in invisible lines to illustrate their relationship when in the stored position.
Figure 12:
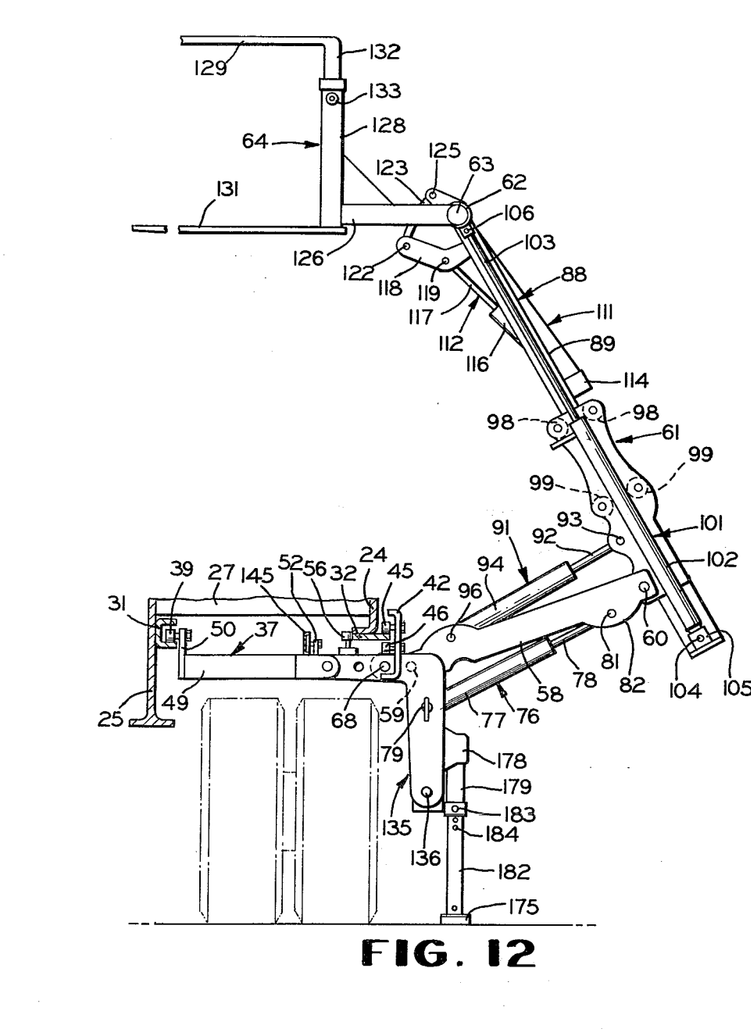
FIG. 12 is an end elevational view of the apparatus of FIG. 4 raised to position the load support means to the height for transferring load between the vehicle and the support means.

A locking means 135 is provided to maintain each sub-base 57 in its stored position beneath bed 22 and its operative load transfer position extended beyond the width limits of the vehicle. Each sub-base has an array of studs protruding outward from its outer plate 66 and coaxial with pivots 68 and 79. Each plate 66 also has a stud 136 at the distal end of its long leg 73. Outboard of each sub-base 57 is an "L" shaped plate providing the locking means by virtue of sockets 137, 138 and 139 located to register with the array of studs 68, 79 and 136 and to receive one of those studs in the stored position and the array of studs in the load transfer position. As shown in FIGS. 5 and 6, when stored the mechanism presents stud 79 in registry with socket 137. FIGS. 7 and 12 show the registration of studs 68, 79 and 136 with sockets 137, 138 and 139 respectively when sub-base 57 is in the load manipulating condition. Engagement of the studs with sockets 137, 138 and 139 is accomplished by shifting lock plate 135 laterally of the carriage or base 37. This is accomplished by sliding the plate along a support rod 140 from which it is pendant as shown in FIGS. 5 and 6. Rod 140 is supported by cross brace 49 and a bracket 141 offset from cross brace 49.

Figure 8:
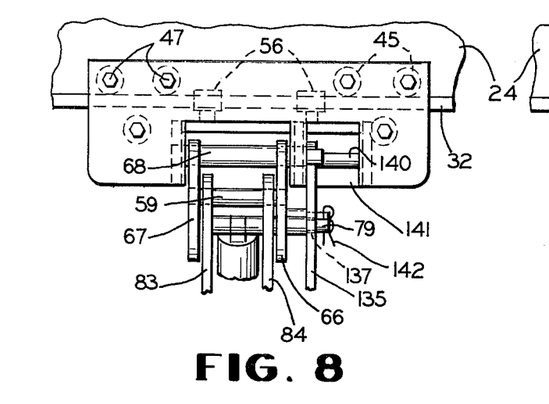
FIGS. 8, 9 and 10 are enlarged side views of the base to sub-base relationship to the latch means illustrating the stored position and latched condition, the stored and unlatched condition, and the load transfer position as latched respectively.
Figure 9:
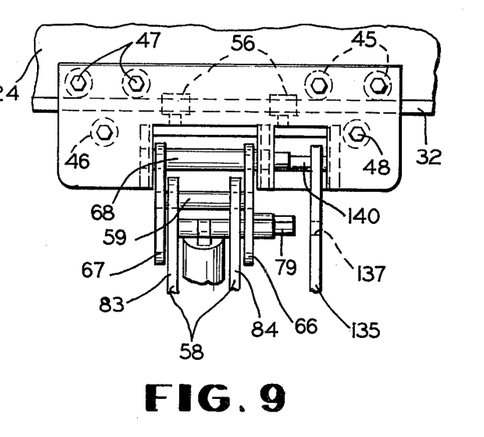
Figure 10:
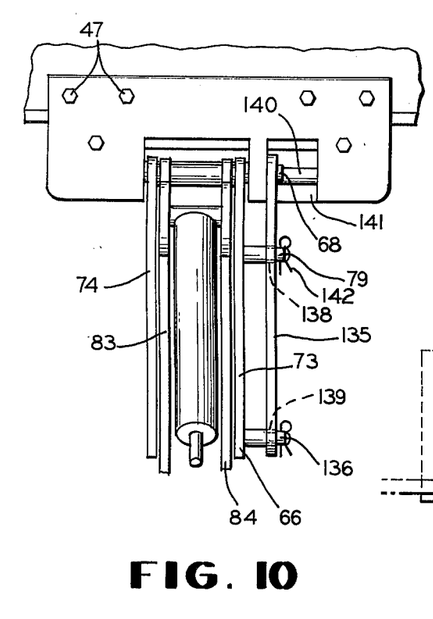

FIGS. 8, 9 and 10 illustrate the lock plate 135 shifted toward outer plate 66 of sub-base 57 while the sub-base is in its stored position. A spring key 142 maintains the lock plate with stud 79 passing through socket 137 by virtue of the passage of the key shank through a suitable aperture in stud 79. In FIG. 9 the spring key 142 is removed and the lock plate 135 shifted to the right on rod 140 to clear the end of the studs. In this condition the linkage drives can be manipulated to bring the sub-base to its load transferring condition. The latch plate is then rotated about rod 140 to bring its sockets 137', 138 and 139 into registry with the sub-base studs 68, 79 and 136 and it is shifted to the left on rod 140 to fit its sockets over the studs. It is then locked in place by replacing spring key 142 in the aperture in stud 79.

Figure 11:
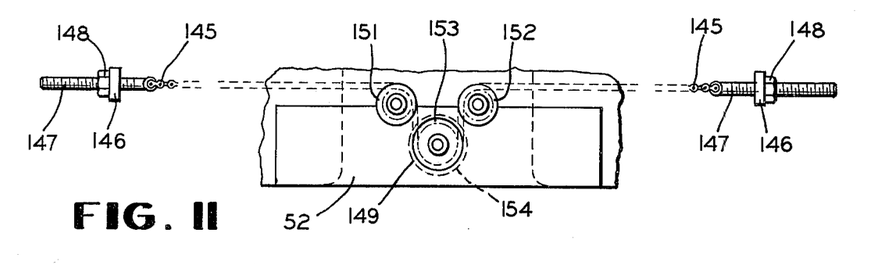
FIG. 11 is a schematic elevational side view taken from the vehicle main frame side of the support for the drive which moves the apparatus along the side of the vehicle broken away to show only portions of the vehicle and broken along the drive chain length to facilitate illustration of the chain tensioning and mounting means.

FIG. 11 shows an arrangement for driving the mechanism along the side of the vehicle. A roller chain 145 is suspended from the underbody of the vehicle along the range of travel of the mechanism and in a position paralleling the rails 31 and 32. One suitable mounting is from plates 146 secured to the vehicle frame 23 and having apertures through which eye bolts 147 pass to tensioning nuts 148. The eyebolts 147 are coupled to the roller chain. A bight 149 is formed intermediate the ends of chain 145 by passing it over idler sprockets 151 and 152 on opposite sides of a drive sprocket 153. With the chain positioned on the sprockets, the tensioning nuts 148 can be turned to impose the desired tension on the chain. A hydraulic motor 154 is mounted on coupling plate 52 which also serves as the mounting for sprockets 151 and 152. Typically a No. 60 roller chain is suitable with idler sprockets having nine teeth and a drive sprocket having 12 teeth driven by a motor producing 1,500 foot pounds of torque. A load of several thousand pounds can be shifted longitudinally of the vehicle with the above form of drive.

Figure 14:
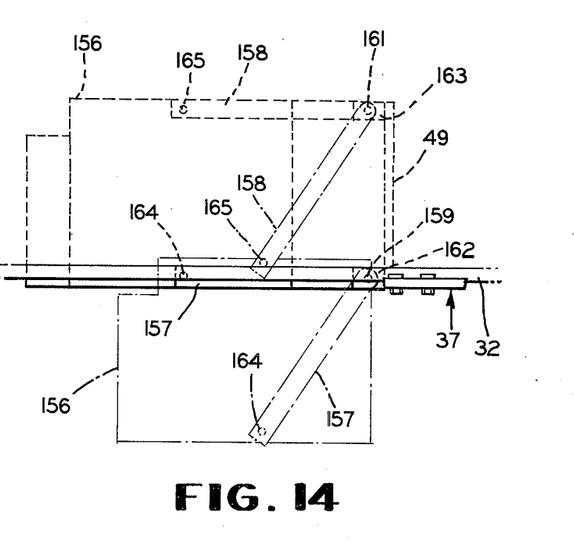
FIG. 14 is a fragmentary top view of the vehicle bed above the power unit and an end portion of the base of the mechanism showing the support of the power unit housing in the stored position and a phantom view of that housing in the extended position.

Power is supplied to the various drive elements from a self-contained power unit 65 integral with the loader and unloader 33. The power package 65 is supported from base 37 by a housing 156 mounted on parallel arms 157 and 158 which are arranged to move in common planes generally parallel to the vehicle bed by virtue of pivotal connections 159 and 161 to brackets 162 and 163 to cross brace 49 at locations near the width limit of the vehicle, in the case of bracket 162, and inward therefrom the depth of housing 156, in the case of bracket 163. Arm 157 is connected to housing 156 at pivot 164 while arm 158 is connected at pivot 165 such that the housing can be swung outward as shown in FIG. 14 when it is desired to drive the loader-unloader along side the wheels of the vehicle.

The power unit includes a gasoline engine or other drive means 166 for a hydraulic pump 167, a battery 168, generator 169, valving (not shown) and a hydraulic reservoir 171. Hydraulic valving (not shown) to the drive units for the double acting cylinders 77, 94, 102 and 116 and motor 154 of the several drives can be provided either at the power unit or on the sub-base with suitable tubing (not shown) from the pump 167 to the valving and from the valving to the front and rear of the respective cylinders. A remote control station (not shown) can be connected to the valve solenoids as by an electrical cable from a control switch box having an inner arm switch to control fluid to cylinders 77 and having an "up", "down" and "off" position, a similar switch for the outer arm control to the solenoid valving controlling fluid to cylinders 94, a cradle tilt control switch with a "left", "right" and "off" condition to control fluid to cylinders 116, an outer arm extension control switch having an "in", "out" and "off" position to control fluid to cylinders 102 and a travel control switch for control of fluid to motor 154 having a "forward", "reverse" and "off" position. It is also desirable to include an emergency stop switch in the control box as a safety precaution.

It is to be understood that when actuated for "up" motion fluid is admitted to the back end of cylinders 77 and 94 while "down" motion involves admitting fluid to the front or piston rod end of the cylinders, in each instance bleeding the fluid from the opposite end of the cylinder back to the reservoir. Similarly the cradle tilt cylinder 116 has fluid admitted to the front end for "left" rotation as viewed from the rear of a vehicle having a right-side mounted loader and unloader 33 and admitted to the rear of cylinder 116 for "right" rotation. Extension of the extension section 88 outward of guide section 87 is accomplished by applying fluid to the back end of cylinder 101, and retraction of that section is by admitting the fluid to the front end of the cylinder 101.

Figure 4:
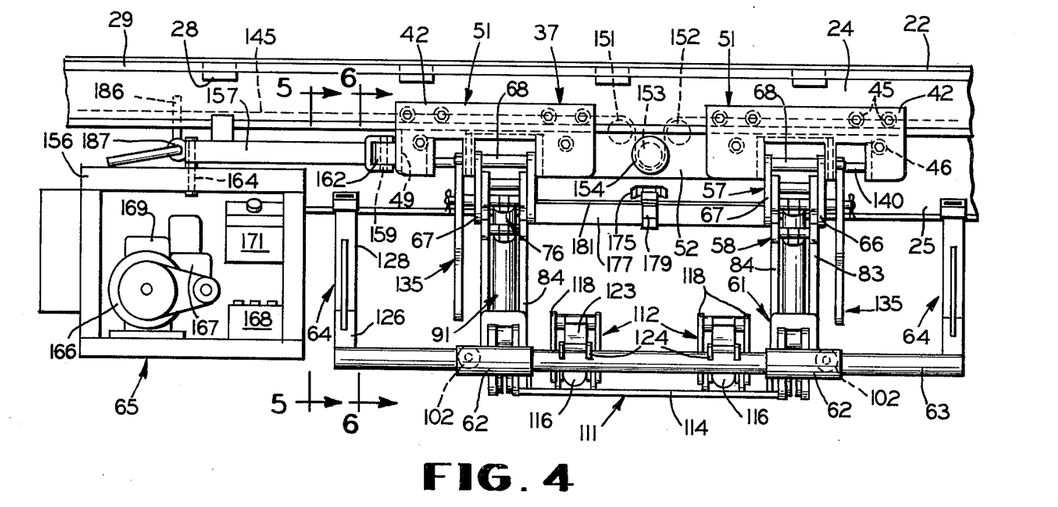
FIG. 4 is an enlarged side elevational view of the apparatus and fragments of the vehicle bed and frame shown in FIG. 3.

The operation and versatility of the booms 58 and 61 and cradle 64 can be appreciated by considering the sequential movement of the booms from the stored position illustrated in FIGS. 4, 5 and 6 to the extended position of FIG. 7 and the raised position of FIGS. 12 and 13. The booms are unfolded by actuating the inner boom cylinder 77 to extend rod 78 and cause the inner boom 58 to pivot clockwise about pin 75 until it is extended with its outer end outboard of the width limits of the vehicle, for example as shown in FIG. 7. The outer boom 61 is then pivoted about pivot 85 to bring it into contact with a support surface such as ground to relieve the weight of the linkages by applying fluid to outer boom cylinders 94 to extend rods 92 and rotate outer booms 61 clockwise. This relieves the forces on lock plates 135 so that sockets 136 can be withdrawn from stud ends of pivots 79. Retraction of rods 78 into cylinders 77 while the linkage is supported at its outer end will cause sub-bases 57 to rotate clockwise about their pivots 68 to base 37 and bring them to a vertical position. Lock plates 135 are then moved to receive the stud ends of pivots 68 and 69 and stud 134 in sockets 136, 137' and 138 thereby locking sub-base in its vertical position. With the sub-base locked vertically the apparatus is conditioned for load manipulating operations.

Under extreme loading conditions the turning moment imposed by the unloader may be excessive and unduly burden the vehicle suspension system. A ground engaging foot 175 is provided to support the loader-unloader 33 under such conditions. Sub-base 57 has a foot support frame 176 secured between its inner plates 67. Frame 176 as shown in FIGS. 12 and 13 comprises a cross member 177 between lobes 178 on the inner plates 67 and a guide tube 179 having its longitudinal axis parallel to the longitudinal axes of the legs 73 and 74 of each sub-base 57 secured to cross member 177 and to lower cross member 181 extending between all plates 66 and 67 of the sub-base 57. A leg 182 fits into guide tube 179 and carries the foot 175 on its lower end. Leg 182 is adjustably extensible from guide tube 179. It is raised to retract essentially the entire length of the leg for storage and is locked with a lock pin at 183 in aperture 184. Lock pin 183 also fixes the ground engaging extension of leg 182 by its engagement with one of a series of registrable apertures in the leg within tube 179.

Once the sub-base is locked and, if deemed desirable the foot 175 extended, the operation of the unloader is accomplished by the coordinated operation of the drive elements whereby tines 129 and/or 131 are engaged with a load by advancement or retraction of outer boom extension 88, rotation of cradle 64 by drive 112 or the manipulation of the inner and outer booms either individually or in a coordinated manner.

Storage of the unit once its load manipulating functions are completed involves removal of tines 129 from guide tubes 128, retraction of support foot 175 by retracting leg 182 and inserting lock pin 183 in aperture 184, release of lock plates 135 from sub-bases 57 the reverse manipulation of the boom drives against the ground to pivot sub-bases 57 around pivots 68 so that their longer legs 73 and 74 are generally parallel to the bed 22 and can be latched in that position by lock plate 135. The inner and outer booms are then manipulated to their retracted position, the power unit is returned to within the width limits of the vehicle, and its latch lever 186 rotated about its pivot bracket 187 on arm 157 to extend behind side rail 24 and retain the unit in its traveling position.

The outer boom 61 is locked by lock plate 135 for storage and transport of the loader and unloader 33 over the road. With the lock plate 135 positioned as shown in FIGS. 5 and 6 its socket 130 registers with a socket in a bracket (not shown) on the outer boom 61 guide section 87. A pin can be inserted through these registered sockets and secured as by a spring key 142. With the entire assembly locked within the width limits of the vehicle the "L" shaped removable tines 129 can be mounted in sockets (not shown) on the inner sides of the cradle arms 126 which receive the base tubes 132 and when secured by lock pins through the apertures in 126 maintain the tines on top of turning cranks 124 and extending along the length of turning tube 63. Thus all elements of the mechanism are maintained in an integral assemblage for transport and are latched in position against displacement such as might be caused by loss of hydraulic pressure or the shocks imposed during travel of the vehicle.

It is to be understood that the above described embodiment of a loader and unloader lends itself to many variations without departing from the spirit and scope of the invention. Therefore, the preceding disclosure is to be read as illustrative and not in a limiting sense.

What I claim is:

1. Load transfer mechanism adapted for mounting on the side of a vehicle having a width limit and adapted for the transfer of load articles between the vehicle bed and a location adjacent the vehicle comprising:
    a base attached to the side of the vehicle;
    a sub-base;
    an inner boom having first and second ends;
    a first pivotal coupling between said inner boom first end and said sub-base;
    means mounting said sub-base for movement relative to said base over a range of motion which includes a first position in which said first pivotal coupling and said inner boom first end are within said vehicle width limit and beneath the vehicle bed and a second position in which said first pivotal coupling and said inner boom first end are located beyond the width limit of said vehicle;
    first operating means for driving said inner boom around said first pivotal coupling;
    an outer boom having first and second ends;
    a second pivotal coupling between said inner boom second end and said outer boom first end, said second pivotal coupling being spaced from said outer boom second end a distance within the width limit of the vehicle when said sub-base is in said first position and being spaced from said inner boom first end a distance less than the height of said first coupling above ground level when said sub-base is in said second position;
    means attached to said outer boom second end for engaging load articles to be transferred; and
    second operating means connected to said outer boom and adapted to drive said outer boom second end in an arc around said second pivotal coupling.

2. Apparatus according to claim 1 wherein said sub-base mounting means includes a third pivotal coupling between saidd base and said sub-base spaced on said sub-base from said first pivotal connection.

3. Apparatus according to claim 1 including locking means to maintain a position of said sub-base with respect to said base.

4. Apparatus according to claim 3 wherein said locking means includes a rigid lock link; and at least a first fixed coupling means between said base and said lock link and at least a second fixed coupling means between said sub-base and said lock link when said sub-base is in said first position.

5. Apparatus according to claim 3 wherein said locking means includes a rigid lock link; and at least a third fixed coupling means between said base and said lock link and at least a fourth fixed coupling means between said sub-base and said lock link when said sub-base is in said second position.

6. Apparatus according to claim 4 wherein said first fixed connection is a shaft mounted on said base for supporting said lock link for reciprocation along the axis of said shaft with respect to said base whereby said lock link is adapted to be reciprocated toward said base to engage said second fixed coupling means and away from said base to release said second fixed coupling means.

7. Apparatus according to claim 4 wherein said first fixed coupling means is a shaft mounted on said base for supporting said lock link for reciprocation along the axis of said shaft with respect to said base and for rotation about said shaft whereby said lock link is adapted to be reciprocated toward said base to engage said second fixed coupling means and away from said base to release said second fixed coupling means when said sub-base is in said first position; a third fixed coupling means between said base and said lock link and a fourth fixed coupling means between said sub-base and said lock link, said lock link being adapted to engage said first and third fixed coupling means with said base and said second and fourth fixed coupling means with said sub-base when reciprocated toward said base while said sub-base is in said second position.

8. Apparatus according to claim 7 wherein said lock link has a first arm extending generally parallel to the bed of the vehicle and a second arm extending generally perpendicular to the bed of the vehicle when said sub-base is in said second position and said second, third and fourth fixed coupling means are engaged.

9. Apparatus according to claim 1 wherein said base is movably attached to the vehicle for aligning said apparatus at selected positions along the side of the vehicle bed.

10. Apparatus according to claim 9 including a first rail proximate a first side of the vehicle bed having upper, lower and side surfaces extending parallel to the first side of said vehicle bed; a second rail located between said first side of said vehicle bed and a side of said vehicle bed opposite said first side and spaced from said first side, said second rail having an upper surface extending parallel to the first side of said vehicle bed; a first plurality of rollers for rolling engagement with said upper surface of said first rail and rotatably mounted on said base; a second plurality of rollers for rolling engagement with said lower surface of said first rail and rotatably mounted on said base; and a third plurality of rollers for rolling engagement with said upper surface of said second rail and rotatably mounted on said base.

11. Apparatus according to claim 10 wherein said second rail has a downwardly facing surface extending parallel to the first side of said vehicle bed, parallel to said upper surface and spaced above said upper surface for rolling engagement with said third plurality of rollers under certain loading conditions of said load transfer mechanism.

12. Apparatus according to claim 10 including a fourth plurality of rollers for rolling engagement with the side of said first rail adjacent said second rail and rotatably mounted on said base.

13. Apparatus according to claim 9 including means for moving said base relative to the vehicle.

14. Apparatus according to claim 13 including an elongate, flexible member secured in tension at spaced locations on said vehicle bed parallel to the side of said vehicle bed; rotatable traction means mounted on said base and engaging at least a bight of said flexible member between said spaced locations; and drive means for said traction member mounted on said base.

15. Apparatus according to claim 14 wherein said flexible member is a roller chain and said traction means is a drive sprocket; and including a pair of idler sprockets engaging said chain each adjacent said drive sprocket and intermediate said drive sprocket and a respective one of said spaced locations at which said roller chain is secured in tension to said vehicle bed.

16. Apparatus according to claim 1 including a ground engageable support foot mounted on said sub-base and adapted to be engageable with ground when said sub-base is in said second position.

17. Apparatus according to claim 16 including a leg extending upward from said support foot when said sub-base is in said second position; and an adjustable coupling between said leg and said sub-base whereby the extension of said leg and support foot can be varied.

18. Apparatus according to claim 1 wherein said outer boom includes a guide section and an extension section telescopically mounted on said guide section and supporting said means for engaging load articles said extension section being arranged for movement longitudinal of said guide section to extend the effective length of said boom by moving said means for engaging load articles outward from said second pivotal connection; and third operating means connected between said first end of said outer boom and said extension section for movement of said extension section longitudinal of said outer boom and relative to said second pivotal connection.

19. Apparatus according to claim 18 wherein said guide section includes longitudinally spaced anti-friction rollers engaging said extension section on opposed portions to accommodate movement of said extension section and longitudinally of said guide section.

20. Apparatus according to claim 1 including a power unit for supplying power to at least one of said operating means; support means for said power unit; and mounting means for said support means secured to said base and shiftable thereon from beneath the bed of said vehicle and within the width limit thereof to a position generally beyond the width limit thereof.

21. Apparatus according to claim 20 wherein said support means comprises a frame having depth and length in dimensions generally parallel to the bed of said vehicle and wherein said mounting means comprises a pair of link arms pivotally mounted on said base at an end thereof beyond the range of motion of said inner and outer booms, said link arms and said support being beyond the range of motion of said inner and outer booms when said mounting means is within the width limit of said vehicle and when said mounting means is generally beyond the width limit of said vehicle.

22. Apparatus according to claim 9 wherein said vehicle has wheel like elements for supporting it on the ground, the bed of said vehicle being spaced from the upper limits of said wheel like elements; and wherein said base is dimensioned to pass between the bed of said vehicle and the upper limits of said wheel like elements when positioned in alignment with said wheel like elements along the side of the vehicle bed.

23. Apparatus according to claim 22 including a power unit for supplying power to at least one of said operating means; support means for said power unit comprising a frame having depth and length in dimensions generally parallel to the bed of said vehicle; a mounting for said support means comprising a pair of link arms pivotally mounted on said base to define arcs in planes generally parallel to the bed of said vehicle, said arms being dimensioned and positioned to pass between the bed of said vehicle and the upper limits of said wheel like elements when moved along the defined arcs.

24. Apparatus according to claim 1 including a rotatable coupling between said second end of said outer boom and said load engaging means, said rotatable coupling having an axis of rotation parallel to the side of the vehicle bed; an offset coupled to said load engaging means and extending radially from the axis of rotation of said rotatable coupling; reciprocating operating means for said load engaging means mounted on said outer boom; a turning arm; a fourth pivotal coupling from said arm to said outer boom; a fifth pivotal coupling between said reciprocating operating means and said turning arm at a location on said arm spaced from said fourth pivotal coupling; and a link pivotally coupled to said offset and said turning arm, the coupling between said link and said arm being spaced along said arm from said fourth and fifth pivotal couplings.

25. Apparatus according to claim 24 wherein said pivotal couplings to said arm are spaced along said arm with said fifth coupling between said fourth coupling and the coupling between said link and said arm.

26. Apparatus according to claim 25 wherein said link is convexly arcuate along its length relative to and in a plane normal to the axis of rotation of said rotatable coupling whereby the motion defined by said offset and said turning arm is free of the axis of rotation of said rotatable coupling over a greater range than a straight link.

27. Apparatus according to claim 22 wherein said sub-base has a leg which, when in said second position, extends generally perpendicular to the bed of the vehicle outside the width limits thereof; including a rigid lock link for maintaining said sub-base in said second position; means to secure said lock link to said base; and means to secure said lock link to said sub-base when in said second position; said lock link having a first leg extending generally parallel to the bed of said vehicle and dimensioned to pass between the bed of said vehicle and the upper limits of said wheel like elements when positioned in alignment with said wheel like elements along the side of the vehicle bed; and said lock link having a second leg extending generally perpendicular to the bed of the vehicle adjacent said leg of said sub-base.

28. Apparatus according to claim 2 wherein said first, second, and third pivotal couplings have pivot axes parallel to the side of said vehicle bed and including a second inner boom, a second outer boom and a second sub-base spaced apart from said first mentioned inner and outer booms and a sub-base, said second inner and outer booms and said second sub-base having pivotal couplings corresponding to said first, second and third pivotal couplings and having pivot axes common with said respective pivotal couplings.

* * * * *